(12) United States Patent
Suzuki et al.

(10) Patent No.: US 6,651,615 B2
(45) Date of Patent: Nov. 25, 2003

(54) DIRECT FUEL INJECTION-TYPE SPARK-IGNITION INTERNAL COMBUSTION ENGINE

(75) Inventors: Hisao Suzuki, Susono (JP); Terutoshi Tomoda, Susono (JP); Mutsumi Kanda, Susono (JP); Toshimi Kashiwagura, Susono (JP); Fumito Chiba, Susono (JP); Sachio Mori, Susono (JP); Satoshi Taniguchi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 52 days.

(21) Appl. No.: 09/918,473

(22) Filed: Aug. 1, 2001

(65) Prior Publication Data

US 2002/0014219 A1 Feb. 7, 2002

(30) Foreign Application Priority Data

Aug. 7, 2000 (JP) ........................................ 2000-244038
Jul. 26, 2001 (JP) ........................................ 2001-226505

(51) Int. Cl.[7] ................................................. F02B 5/00
(52) U.S. Cl. ........................ 123/305; 123/298; 123/659
(58) Field of Search ............................ 123/305, 193.6, 123/659, 294, 275, 276, 298

(56) References Cited

U.S. PATENT DOCUMENTS 5,813,385 A * 9/1998 Yamauchi et al. .......... 123/276
6,035,823 A 3/2000 Koike et al.

FOREIGN PATENT DOCUMENTS

| DE | 199 25 256 A 1 | 6/1999 |
| JP | 62-182422 | 8/1987 |
| JP | A 10-26024 | 1/1998 |
| JP | A 10-169446 | 6/1998 |
| JP | 10-331642 | 12/1998 |
| JP | 11-082028 | 3/1999 |
| JP | 11-200865 | 7/1999 |
| JP | A 11-223127 | 8/1999 |
| JP | A 11-247660 | 9/1999 |
| JP | 2000-179441 | 6/2000 |

* cited by examiner

Primary Examiner—Tony M. Argenbright
Assistant Examiner—Katrina B. Harris
(74) Attorney, Agent, or Firm—Oliff & Berridge, PLC

(57) ABSTRACT

A direct fuel injection-type spark-ignition internal combustion engine is disclosed. The engine comprises a fuel injector for injecting fuel as a spray in nearly the shape of a fan having a relative small thickness, a spark plug and a cavity formed on the top surface of a piston. The cavity has a long and narrow groove-like shape. The spray is injected by the fuel injector such that the spray is almost parallel with the center axis of the piston, and impinges in the cavity. The spark plug is arranged in the upper portion of the cylinder to face the cavity.

10 Claims, 15 Drawing Sheets

DIRECT FUEL INJECTION-TYPE SPARK-IGNITION INTERNAL COMBUSTION ENGINE

BACKGROUND OF THE INVENTION

1. Field of the Invention

The present invention relates to a direct fuel injection-type spark-ignition internal combustion engine.

2. Description of the Related Art

There has heretofore been known stratified charge combustion, produced by directly injecting fuel into a cylinder to form a mixture that can be favorably ignited (combustible mixture) only in the vicinity of a spark plug, at the ignition timing, to burn a lean mixture in the cylinder as a whole. To carry out the stratified charge combustion, in general, fuel is injected in the latter half of the compression stroke. It is intended that the thus injected fuel proceeds into a concave cavity formed on the top surface of the piston, is deflected toward the spark plug by the shape of the cavity, and forms a combustible mixture near the spark plug.

Japanese Unexamined Patent Publication No. 11-223127 discloses a direct fuel injection-type spark-ignition internal combustion engine in which the spark plug is arranged near the center of the upper portion of the cylinder, the fuel injector injects fuel in the shape of a fan having a relatively small thickness such that the injected fuel can vaporize easily to come into sufficient contact with high temperature and high pressure intake air in the cylinder, and the fuel injector is arranged in the periphery in the upper portion of the cylinder. The cavity extends from the center portion on the top surface of the piston to the fuel injector side of the periphery portion thereon, and has a bottom wall, a spark plug side wall, and a fuel injector side wall. The fuel injected from the oblique upper side into the cavity, impinges on the bottom wall and thereafter proceeds along the bottom wall toward the spark plug side wall. Next, the fuel is deflected toward the spark plug by the spark plug side wall.

In such a direct fuel injection-type spark-ignition internal combustion engine, if the injected fuel impinges the bottom wall of the cavity, a combustible mixture can be formed favorably in the vicinity of the spark plug. However, the injecting direction of the fuel injector is fixed on one direction, i.e., an oblique lower direction, and thus an extent between the positions of the piston in which such a fuel injection is allowed is relative narrow. Therefore, a fuel injection period is restrained and thus only a relative small amount of fuel can be injected. Accordingly, the stratified charge combustion having high fuel consumption efficiency can be carried out only in low engine load operating conditions. Besides, in high engine speed operating conditions, a period in which fuel can be injected becomes very short and thus the stratified charge combustion substantially cannot be carried out.

SUMMARY OF THE INVENTION

Therefore, an object of the present invention is to provide a direct fuel injection-type spark-ignition internal combustion engine, which can extend a period that fuel can be injected to form a combustible mixture, and which can enlarge an engine operating area in which the stratified charge combustion can be carried out to the high engine speed side and the high engine load side.

According to the present invention, there is provided a direct fuel injection-type spark-ignition internal combustion engine comprising: a fuel injector for injecting fuel as a spray in nearly the shape of a fan having a relative small thickness; a spark plug; a cavity formed on the top surface of a piston; wherein the cavity being a long and narrow groove-like shape, the spray being injected by the fuel injector such that the spray is almost parallel with the center axis of the piston, and impinging in the cavity, and the spark plug being arranged in the upper portion of the cylinder to face on the cavity.

DESCRIPTION OF THE PREFERRED EMBODIMENT

Figure 1:
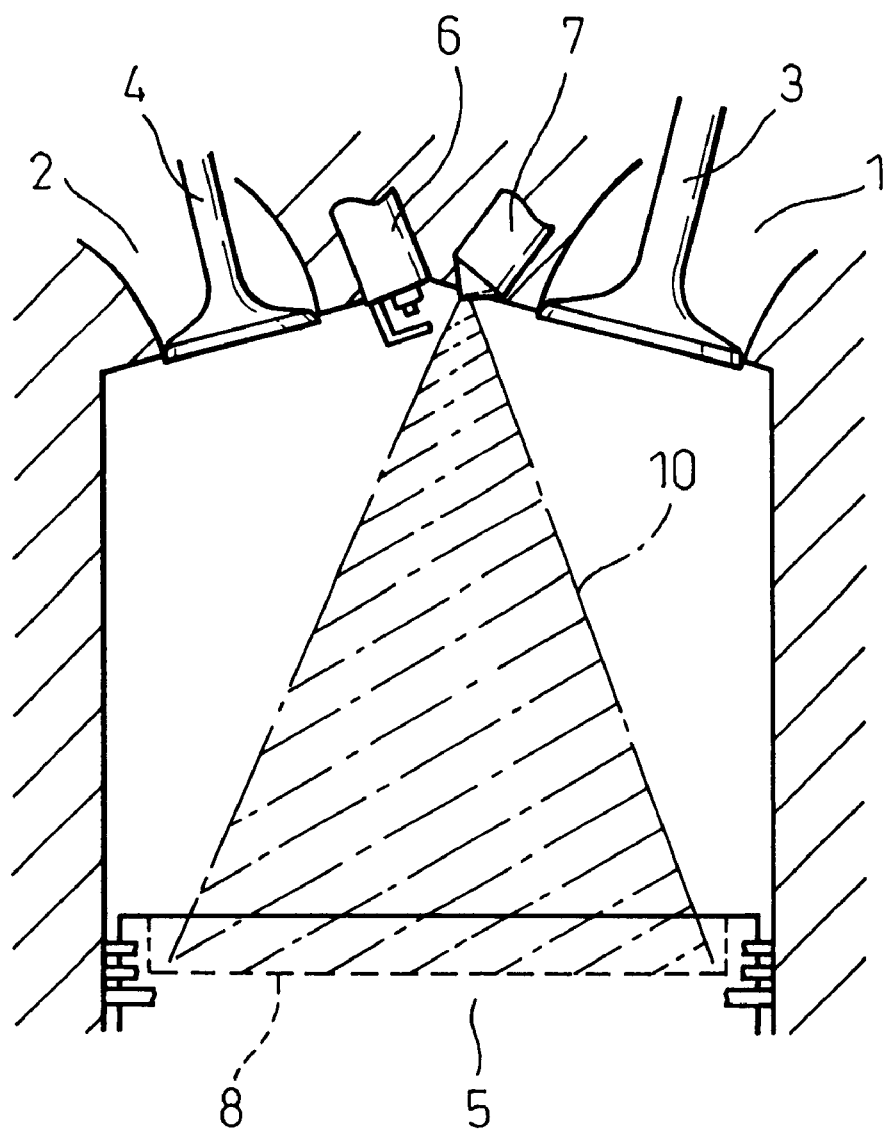
FIG. 1 is a vertical sectional view schematically illustrating a part of direct fuel injection-type spark-ignition internal combustion engine according to a first embodiment of the present invention.
Figure 2:
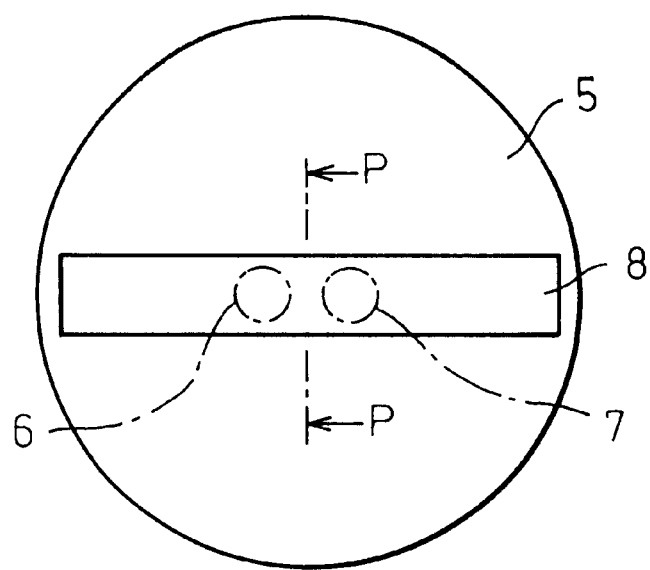
FIG. 2 is a plan view of a piston shown in FIG. 1.

FIG. 1 is a vertical sectional view schematically illustrating a direct fuel injection-type spark-ignition internal combustion engine according to a first embodiment of the present invention, and FIG. 2 is a plan view of a piston shown in FIG. 1. In these figures, reference numeral 1 denotes an intake port and 2 denotes an exhaust port. The intake port 1 is communicated with the cylinder via an intake valve 3, and the exhaust port 2 is communicated with the cylinder via an exhaust valve 4. Reference numeral 5 denotes a piston having a cavity 8 formed in the top surface thereof. Reference numeral 6 denotes a spark plug arranged in nearly the central upper portion of the cylinder. Reference numeral 7 is a fuel injector arranged adjacent to the spark plug 6.

The fuel injector 7 has a slit-like injection hole and injects fuel as a fan shaped spray 10 having a relatively small thickness. The injection hole of the fuel injector 7 is directed such that the injected fan shaped spray 10 is almost parallel with the center axis of the piston 5, i.e., such that the center plane in the thickness direction of the injected fan shaped spray 10 is almost parallel with the center axis of the piston 5. The cavity 8 is a long and narrow groove almost across the top surface of the piston 5 to pass through the center of the top surface of the piston 5. Namely, the cavity 8 extends in the direction in which the spray extends in the fan shape. Thus, if an included angle of the fan shape of the spray 10 is suitably selected, the fan shaped spray 10 can enter into the cavity 8 even when the piston is at a relative low position such in the end stage of the intake stroke, the initial stage of the compression stroke, or the middle stage of the compression stroke.

Figure 4:
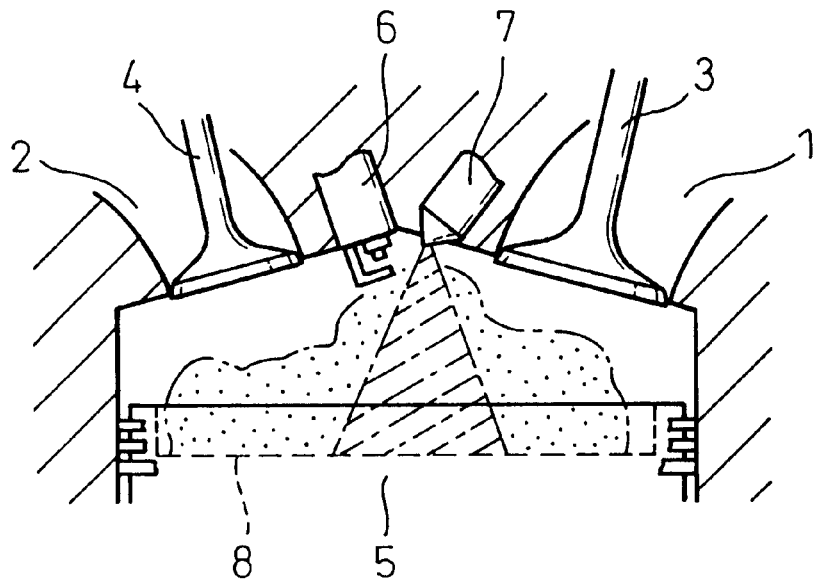
FIG. 4 is a vertical sectional view schematically illustrating a part of the direct fuel injection-type spark-ignition internal combustion engine shown in FIG. 1 in the end stage of the compression stroke.

The fan shaped spray with a relative small thickness favorably comes in contact with high temperature intake air while flying in the cylinder, is sufficiently heated, and is atomized. Thus, in the stratified charge combustion, even if the fuel injection starts from the initial stage of the compression stroke, the middle stage of the compression stroke, or the end stage of the intake stroke in a certain case, all of the injected fuel enters into the cavity 8 on the top surface of the piston with a condition in which the fuel can be easily vaporized. Thereafter, the fuel is perfectly vaporized by heat received from the cavity 8, and thus in the end stage of the compression stroke, a mass of combustible mixture is formed in and above the cavity 8 as shown by dots in FIG. 4. The spark plug 6 is arranged to face the cavity 8. Therefore, the spark plug 6 can ignite and burn favorably the thus formed combustible mixture. Thus, in the stratified charge combustion, the starting time of the fuel injection can be freely selected and therefore, a period of the fuel injection in the stratified charge combustion can be extended and a relatively large amount of fuel can be injected. Accordingly, an engine operating area in which the stratified charge combustion having high fuel consumption efficiency can be carried out is not limited to low engine load operating conditions and can be enlarged to the high engine speed side and the high engine load side.

Figure 3:
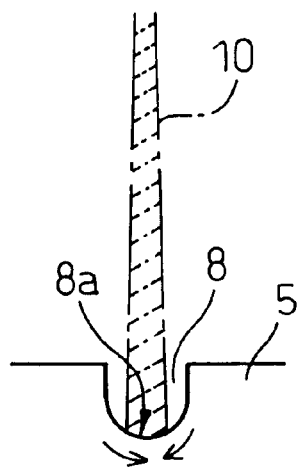
FIG. 3 is a (P)—(P) sectional view of FIG. 2.

In the present embodiment, the fan shaped spray 10 is injected such that the center in the thickness direction thereof almost conforms to the center in the width direction of the cavity 8 regardless of the piston position. The thickness of the fan shaped spray 10 is relative small. However, if the piston position is low and the fan shaped spray 10 flies a long distance, the tip portion of the spray extends, to some degree, in the thickness direction. In the present embodiment, the bottom wall 8a of the cavity 8 on which the fan shaped spray 10 impinges is curved in a concave shape in the width direction of the cavity 8 as shown in FIG. 3. Therefore, the fuel impinged on the bottom wall 8a is converged into the center of the width direction (arrow direction) of the cavity 8, and thus the vaporized fuel in the cavity 8 hardly disperses to the outside in the width direction of the cavity 8. Thus, a mass of the combustible mixture can be positioned in and above the cavity 8 and thus the spark plug 6 that faces on the cavity 8 can certainly ignite and burn the combustible mixture.

In the present embodiment, the position of the spark plug 6 is in the vicinity of the center of the upper portion of the cylinder. Therefore, in the long and narrow combustible mixture formed similar to the cavity shape, the central portion thereof is ignited by the spark plug and the flame progresses to both sides of the combustible mixture simultaneously. Accordingly, the combustion speed is high and thus a good stratified charge combustion can be realized. However, this does not limit the present invention. The spark plug may face on the cavity 8 in any position. Therefore, even if the combustion speed becomes slightly low, a mass of the combustible mixture formed in and above the cavity can be certainly ignited and burned.

Besides, in the present embodiment, the position of the fuel injector 7 is in the vicinity of the center of the upper portion of the cylinder. However, this also does not limit the present invention. For example, even if the fuel injector is arranged in the peripheral of the upper portion of the cylinder, the fuel injector can inject the fan shaped spray such that it is almost parallel with the center axis of the piston. Therefore, the fan shaped spray can certainly enter into the groove-like cavity on the piston that is in a low position and thus effects similar to that mentioned above can be obtained.

The center in the width direction of the groove-like cavity 8 conforms to the diameter of the top surface of the piston. However, positions of the cavity 8, the spark plug 6, and the fuel injector 7 may be slightly shifted parallel with the present positions. Further, the cavity 8 is formed almost across the top surface of the piston and therefore, the length thereof becomes long. Thus, the fan shaped spray can certainly enter into the cavity on the piston that is in a low position as mentioned above. However, if the cavity is formed completely across the top surface of the piston, the fuel injected into the cavity can flow out to the circumference of the piston. This is undesirable.

Figure 5:
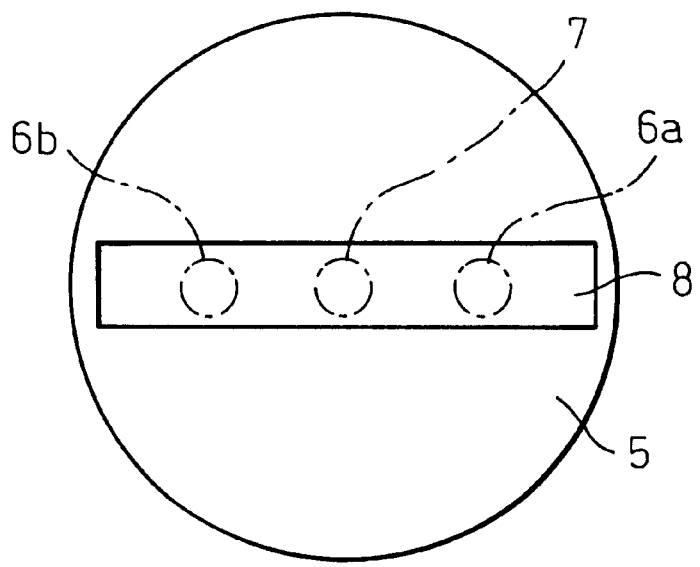
FIG. 5 is a plan view corresponding to FIG. 2 illustrating a modification of the direct fuel injection-type spark-ignition internal combustion engine shown in FIG. 1.

FIG. 5 is a plan view corresponding to FIG. 2 illustrating a modification of the first embodiment. In the modification, a fuel injector 7 is arranged in the vicinity of the center of the upper portion of the cylinder and two spark plugs 6a and 6b are arranged on both sides of the fuel injector 7 in the upper portion of the cylinder to face on the cavity 8. This arrangement of the fuel injector 7 allows the center axis of the width and the thickness of the fan shaped spray conform to the center axis of the piston, and thus a mass of the combustible mixture positioned in and above the cavity 8 can be formed to have symmetrical concentration and symmetrical shape each of which boundaries conforms to the center plane in the longitudinal direction of the cavity. Accordingly, the parts of the combustible mixture which are symmetric each other can be ignited and burned by the two spark plugs 6a and 6b simultaneously and thus the combustion speed is made twice of that in the first embodiment in a simple consideration. Therefore, the stratified charge combustion can be made more favorably.

Figure 6:
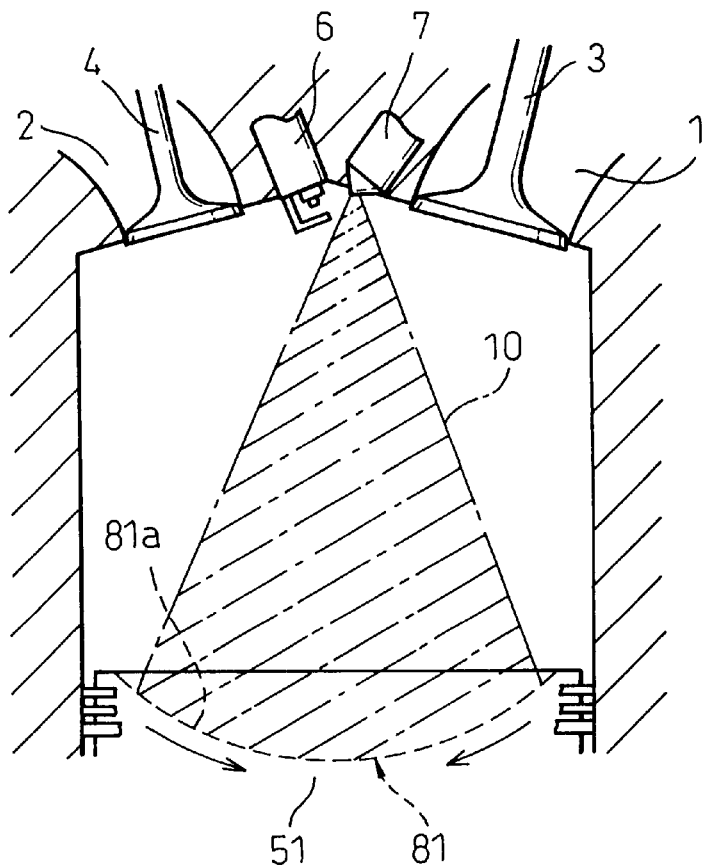
FIG. 6 is a vertical sectional view schematically illustrating a part of direct fuel injection-type spark-ignition internal combustion engine according to a second embodiment of the present invention.
Figure 7:
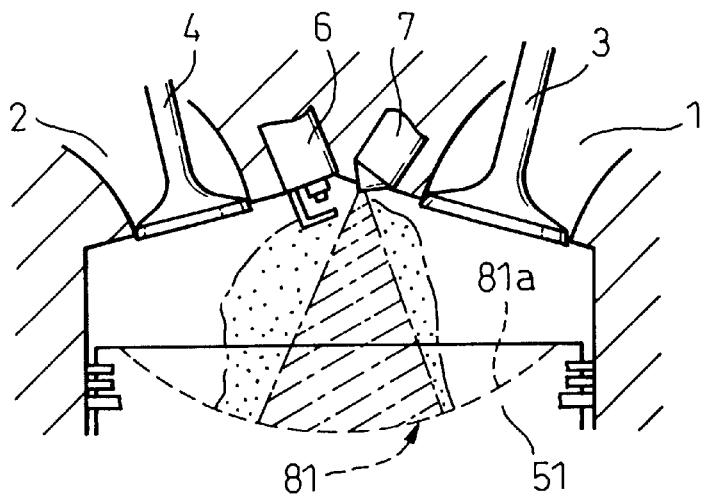
FIG. 7 is a vertical sectional view schematically illustrating a part of the direct fuel injection-type spark-ignition internal combustion engine shown in FIG. 6 in the end stage of the compression stroke.

FIG. 6 is a vertical sectional view schematically illustrating a direct fuel injection-type spark-ignition internal combustion engine according to a second embodiment of the present embodiment. Differences between the first and second embodiments are explained as follows. In the present embodiment, a cavity 81 formed on the top surface of the piston has a bottom wall 81a curved in a concave shape in the longitudinal direction. Therefore, the fuel impinged on the bottom wall 81a is converged to the center in the longitudinal direction (arrow direction) of the cavity 81. Thus, in the end stage of the compression stroke, a mass of the combustible mixture is formed in and above the cavity 8 as shown by dots in FIG. 7. In particular, the spark plug 6 is arranged to face on the center in the longitudinal direction of the cavity 81 and thus the thus-formed combustible mixture can be ignited and burned favorably. In the present embodiment, the fuel vaporized in the cavity 81 can be converged to the vicinity of the spark plug 6 and thus the combustible mixture can be more certainly ignited and burned.

In the first and second embodiments, the positions of the spark plug, fuel injector, and the cavity are independent of the positions of the exhaust port and the intake port. For example, the cavity may extend between the intake port and the exhaust port in a plan view, and the spark plug and the fuel injector may be arranged suitably for this cavity arrangement.

Figure 8:
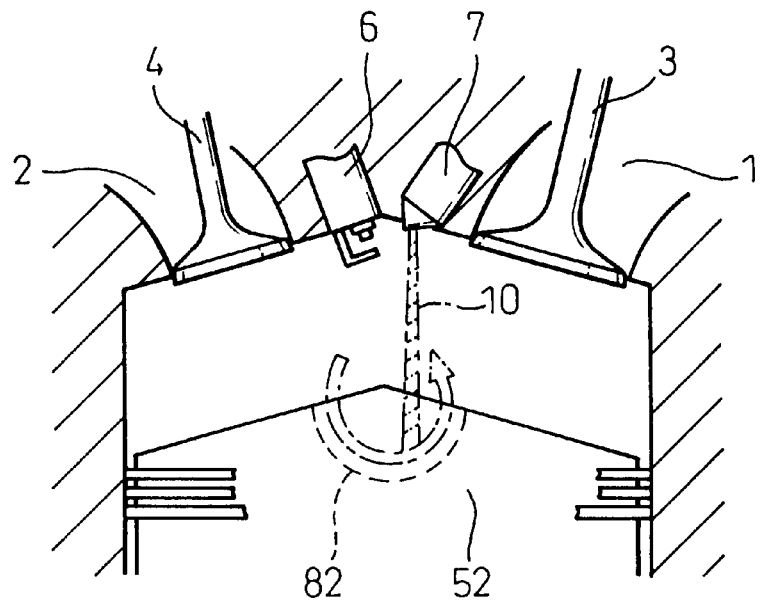
FIG. 8 is a vertical sectional view schematically illustrating a part of direct fuel injection-type spark-ignition internal combustion engine according to a third embodiment of the present invention.

FIG. 8 is a vertical sectional view schematically illustrating a part of direct fuel injection-type spark-ignition internal combustion engine according to a third embodiment of the present invention. Differences between the first and third embodiments are explained as follows. In the present embodiment, a groove-like cavity 82 formed on the top surface of the piston 52 extends between the intake ports 1 and the exhaust port 2 in a plan view. Further, the width of the cavity 82 is larger than that of the cavity 8 in the first embodiment.

In the present embodiment, the shape and the like of the intake port 1 are designed such that intake air introduced into the cylinder in the intake stroke produces a tumble stream that moves down along the exhaust port side of the cylinder bore and moves up along the intake port side thereof. The tumble stream continues in the compression stroke. In the latter half of the compression stroke, the tumble stream enters into the cavity 82 with rising of the piston and thereafter rotates vertically in the cavity 82. The cavity 82 in the present embodiment has a bottom wall curved in a concave shape in the width direction thereof similarly with the first embodiment. The shape of the bottom wall also functions as a guide to facilitate the rotation of the tumble stream in the cavity 82.

The fuel injector 7 injects fuel into the cavity 82 such that the width direction of the fan shaped spray conforms to the extending direction of the cavity 82. The thus injected fuel rotates with the tumble stream rotating vertically in the cavity 82. Thus, the fuel is sufficiently mixed with the intake air in the cavity, is vaporized, does not disperse to the outside of the cavity, and forms a combustible mixture in the vicinity of the spark plug 6. Therefore, the combustible mixture can be certainly ignited and burned and good stratified charge combustion can be realized.

Figure 9:
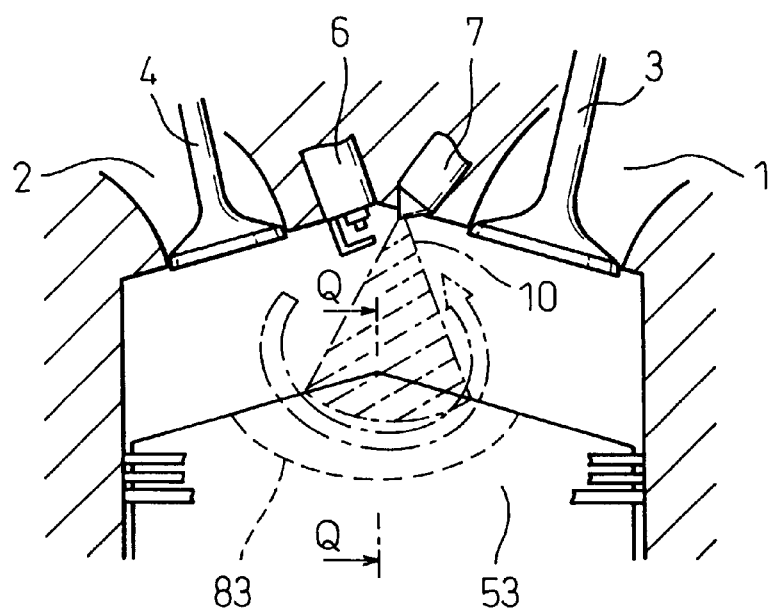
FIG. 9 is a vertical sectional view schematically illustrating a part of direct fuel injection-type spark-ignition internal combustion engine according to a fourth embodiment of the present invention.

FIG. 9 is a vertical sectional view schematically illustrating a part of direct fuel injection-type spark-ignition internal combustion engine according to a fourth embodiment of the present invention. Differences between the second and fourth embodiments are explained as follows. In the present embodiment, the width of the groove-like cavity 83 formed on the top surface of the piston 53 is larger than that of the cavity 81 in the second embodiment and the length thereof is shorter than that in the second embodiment. Further the cavity 83 is formed on the center portion of the top surface of the piston. In the direct fuel injection-type spark-ignition internal combustion engine according to the present embodiment also, a tumble stream enters into the cavity 83 in the latter half of the compression stroke and the tumble stream rotates vertically in the cavity 83 similarly to the third embodiment. The tumble stream rotating vertically in the cavity 83 shown by a chain and dot line arrow can sufficiently mix the fuel injected, as the fan shaped spray, with the intake air in the cavity, can vaporize the fuel, and can prevent the dispersion of the fuel to the outside of the cavity. Thus, good stratified charge combustion can be realized similarly with the third embodiment.

FIGS. 10(A), 10(B), 10(C), 10(D) and 10(E) are a (Q)—(Q) sectional view of FIG. 9, respectively and show various sectional shapes of the cavity 83 in the fourth embodiment. The various sectional shapes of the cavity can be applied to all of the embodiments as mentioned above and below. FIG.

Figure 10A:
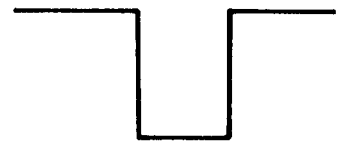
FIGS. 10(A), 10(B), 10(C), 10(D), and 10(E) are a (Q)—(Q) sectional view of FIG. 9, respectively.
Figure 10B:
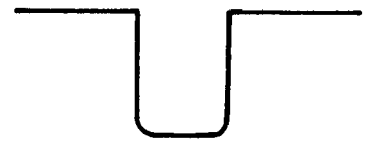
Figure 10C:
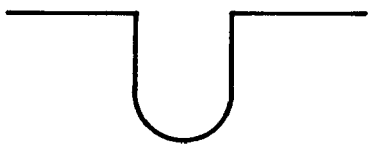
Figure 10D:
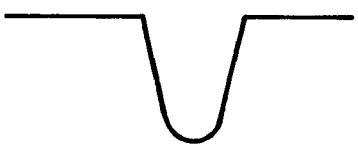
Figure 10E:
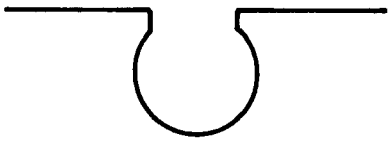

10(A) shows a simple rectangular sectional shape. FIG. 10(B) shows a rectangular sectional shape in which the side walls and the bottom wall are connected smoothly by small arc surfaces. In a sectional shape of FIG. 10(C), the bottom wall is an arc surface. In a sectional shape of FIG. 10(D), the bottom wall is an arc surface and both of the side walls incline toward the inside of the cavity. A sectional shape of FIG. 10(E) has two small vertical side walls and an arc surface bottom wall of which diameter is larger than a distance between the two side walls.

Figure 11:
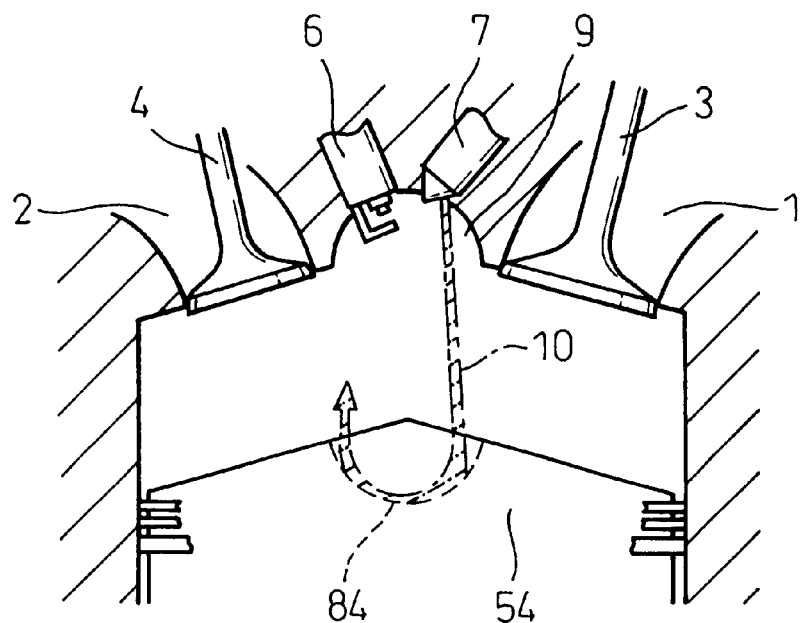
FIG. 11 is a vertical sectional view schematically illustrating a part of direct fuel injection-type spark-ignition internal combustion engine according to a fifth embodiment of the present invention.

FIG. 11 is a vertical sectional view schematically illustrating a part of direct fuel injection-type spark-ignition internal combustion engine according to a fifth embodiment of the present embodiment. Differences between the third and fifth embodiments are explained as follows. The shape of the cavity 84 in the present embodiment is very similar to that of the cavity 82 in the third embodiment. However, the fan shaped spray injected from the fuel injector 7 impinges on the end portion in the width direction of the bottom wall of the cavity 84. Further, on the cylinder-heads, a cavity 9, very similar to the cavity 84, is formed to face the cavity 84, and the spark plug 6 and the fuel injector 7 are arranged in the cavity 9. In such a construction, as shown in FIG. 11, the fan shaped spray 10 progresses from the one end portion of the curved bottom wall of the cavity 84 to the other end portion thereof and thereafter is directed upwardly. Next, the spray impinges on the end portion of the curved bottom wall (the upper wall), progresses from the end portion of the bottom wall to the other end portion thereof, and thereafter is directed downwardly.

Figure 12:
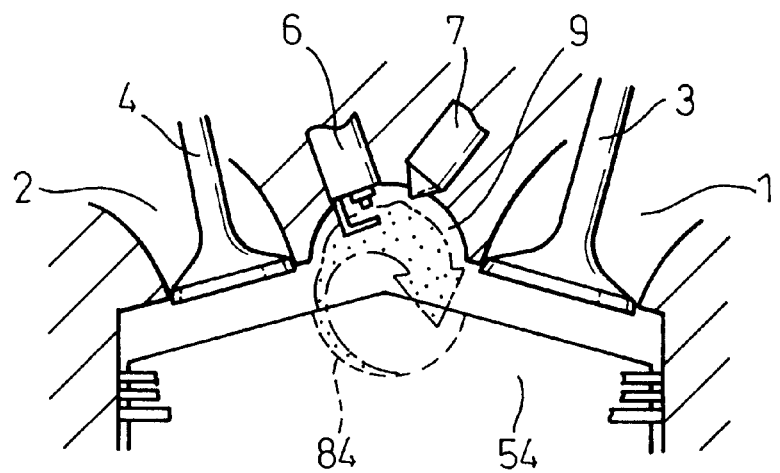
FIG. 12 is a vertical sectional view schematically illustrating a part of the direct fuel injection-type spark-ignition internal combustion engine shown in FIG. 11 in the end stage of the compression stroke.

Thus, in the initial stage of the fuel injection in the latter half of the compression stroke, the injected fuel rotates in an oval shape between the cavity 84 on the piston and the cavity 9 on the cylinder-head and is vaporized gradually. In the end stage of the compression stroke, the two cavities 84 and 9 are closed each other and the combustible mixture rotating in an almost circle shape between the two cavities is produced as shown by dots in FIG. 12. The combustible mixture does not disperse to the outside of the cavity and is always in contact with the spark plug 6 arranged in the cavity 9 on the cylinder head. Thus, the combustible mixture is surely ignited and be burned. Therefore, even if the tumble stream is not produced in the intake stroke, good stratified charge combustion can be realized. The production of the tumble stream in the intake stroke certainly increases suction resistance. Therefore, even if the tumble stream is not be produced, the intake air charging efficiency can be improved.

In the present embodiment, if the spark gap of the spark plug 6 is positioned in the vicinity of the center of the circle section formed by the two cavities 9 and 84, the burning can start from the center of the combustible mixture. Therefore, the combustion speed becomes high and thus the stratified charge combustion becomes more favorably. Besides, the shape of the cavity 84 on the top surface of the piston may not be the same as that of the cavity 9 on the cylinder-head. For example, the depth of the cavity 9 on the cylinder-head may be smaller than that of the cavity 84 on the top surface of the piston. Therefore, after igniting, the combustible mixture expands easily in a whole of the cylinder and thus the stratified charge combustion can become more favorably.

Figure 13:
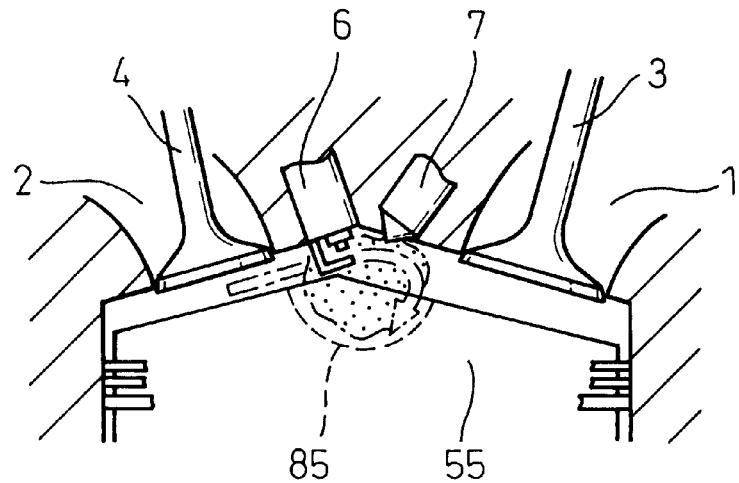
FIG. 13 is a vertical sectional view schematically illustrating a part of direct fuel injection-type spark-ignition internal combustion engine according to a sixth embodiment of the present invention.

FIG. 13 is a vertical sectional view schematically illustrating a part of direct fuel injection-type spark-ignition internal combustion engine according to a sixth embodiment of the present invention. Differences between the third and sixth embodiments are explained as follows. In the piston 55 in the present embodiment, the top surface of the exhaust port side is positioned higher than that of the intake port side. Therefore, a squish area is formed between the top surface of the piston in the exhaust port side and the cylinder-head. Thus, a squish stream is produced in the end stage of the compression stroke and the squish stream flows into the cavity 85 formed on the top surface of the piston from the intake port side as shown a chain and dot line arrow. Therefore, the fuel injected into the cavity 85 in the compression stroke is sufficiently mixed with the intake air in the cavity by the squish stream. Thus, the combustible mixture formed in the cavity is certainly in contact with the spark plug, and can be ignited and burned. Therefore, good stratified charge combustion can be realized.

Figure 14:
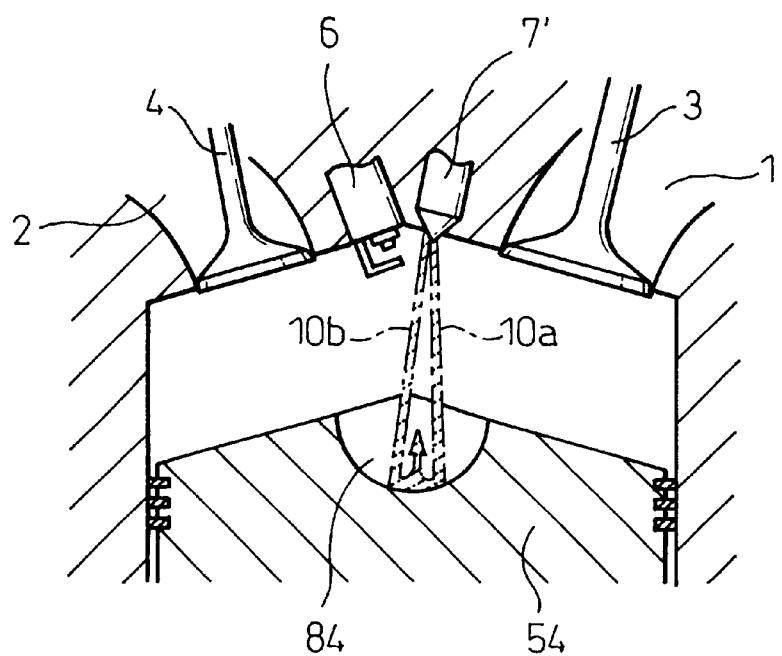
FIG. 14 is a vertical sectional view schematically illustrating a part of direct fuel injection-type spark-ignition internal combustion engine according to a seventh embodiment of the present invention.

FIG. 14 is a vertical sectional view schematically illustrating a part of direct fuel injection-type spark-ignition internal combustion engine according to a seventh embodiment of the present invention. Differences between the third and the seventh embodiments are explained as follows. In the present embodiment, the shape of the groove-like cavity 84 formed on the top surface of the piston is similar to that of the cavity 82 in the third embodiment. However, the fuel injector 7' for injecting fuel into the cavity 84 injects two fan shaped sprays 10a and 10b. The two fan shaped sprays 10a and 10b are almost parallel each other and each of them is almost parallel with the center axis of the piston. Further, each of the two fan shaped sprays impinge on the bottom wall of the cavity 84 curved in a concave shape such that each center plane in the thickness direction of them is offset from the center plane in the width direction of the cavity in the opposite side each other.

Thus, after the two sprays impinge on the bottom wall of the cavity 84, the two sprays progress along the bottom wall toward the center in the width direction of the cavity 84, impinge each other, and are deflected upward. The fan shaped sprays enter into the cavity with a condition in which they easily vaporize and thus they can vaporize sufficiently by heat received from the cavity as mentioned above. Further, the impingement on each other promotes atomization and thus the injected fuel can vaporizes more easily. Therefore, all of the injected fuel can certainly vaporize by the end stage of the compression stroke.

The two sprays progress toward the center in the width direction of the cavity 84 each other. Therefore, as explained in the first embodiment, the vaporized fuel in the cavity 84 hardly disperses toward to outside in the width direction of the cavity 84. A good stratified charge combustion can be realized by use of the thus formed combustible mixture. In the present embodiment, the use of two sprays can increase an amount of injected fuel per unit time and thus an engine operating area in which the stratified charge combustion can be carried out can enlarge more favorably to the high engine speed side and the high engine load side.

In the present embodiment, of course, the center planes in the thickness directions of the two fan shaped sprays may be perfectly parallel each other and may be perfectly parallel with the center axis of the piston. However, if each of the sprays can enter into the cavity on the piston which is in relative low position, they may not be perfectly parallel each other, may not be perfectly parallel with the center axis of the piston, and a slight inclination between the center planes of the two sprays may be provided.

Figure 15:
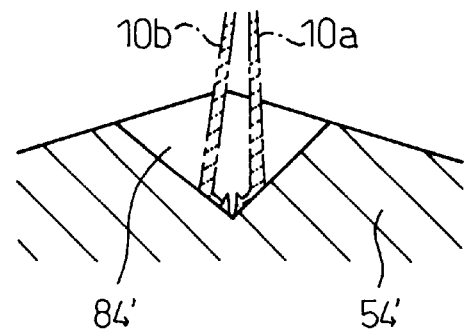
FIG. 15 is a sectional view of a piston illustrating a modification of the cavity in the direct fuel injection-type spark-ignition internal combustion engine shown in FIG. 14.

FIG. 15 is a sectional view of the piston 54' of a modification of the cavity in the seventh embodiment. The cavity 84' in this modification has no bottom wall and has two side walls which are in a wedge shape. As shown in FIG. 15, the two sprays impinge on the two side walls, respectively. In such a construction, each of the two sprays impinges on the side wall at a relative small acute angle, and thus progresses easily toward the center in the width direction of the cavity 84'. Therefore, the vaporized fuel in the cavity 84' disperses very slightly toward the outside in the width direction of the cavity 84'. This is advantage to ensure certain ignition of the mixture when the amount of injected fuel is very small in stratified charge combustion.

Figure 16:
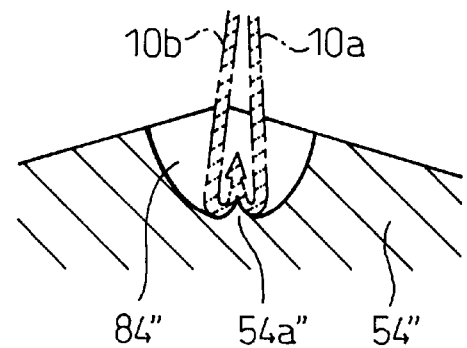
FIG. 16 is a sectional view of a piston illustrating another modification of the cavity in the direct fuel injection-type spark-ignition internal combustion engine shown in FIG. 14.

However, on the other hand, when an amount of injected fuel becomes relatively large in the stratified charge combustion, a part of the injected fuel can remain in the pointed end of the wedge shape of the cavity 84' as liquid fuel. The liquid fuel is discharged as unburned fuel and deteriorates exhaust emission. FIG. 16 is a sectional view of the piston 54" of another modification of cavity in the seventh embodiment. Differences between the cavity 84" of the modification and the cavity 84 of the seventh embodiment are as follows. The cavity 84" has a projection 54a" that extends in the longitudinal direction of the cavity 84" at the center of the width direction of the cavity 84". The two spray impinge on the bottom wall of the cavity 84" and progress along the bottom wall toward the center of the width direction of the cavity 84" each other. The projection 54a" functions to deflect the two sprays progressing along the bottom wall certainly upward and thereafter the two spray impinge on each other. Therefore, in the present embodiment, even if an amount of injected fuel becomes large, no liquid fuel remains in the cavity.

Figure 17:
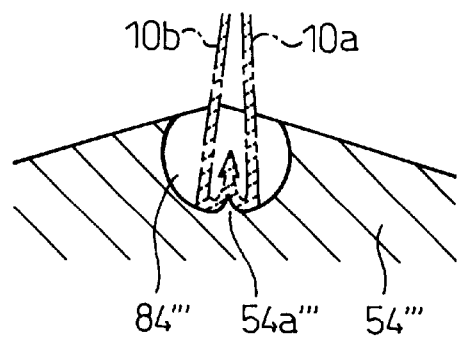
FIG. 17 is a sectional view of a piston illustrating a further modification of the cavity in the direct fuel injection-type spark-ignition internal combustion engine shown in FIG. 14.

FIG. 17 is a sectional view of the piston 54'" of a further modification of the cavity in the seventh embodiment. Differences between the cavity 84'" of the modification and the cavity 84" of FIG. 16 are explained as follows. Each top portion of the side walls of the cavity 84'" projects toward the inside of the cavity 84'". In the cavity of the present modification, of the seventh embodiment, and of the modification of FIG. 16, each spray impinges on the bottom wall at a large acute angle. Therefore, a part of fuel in the spray can progress toward the outside in the width direction. In this case, according to the cavity 84'" in the present modification, each top portion of the side walls projects toward the inside the cavity 84'" and thus the part of the fuel progressing toward the outside in the width direction does not disperse to the outside of the cavity, and can remain in the cavity.

Figure 18:
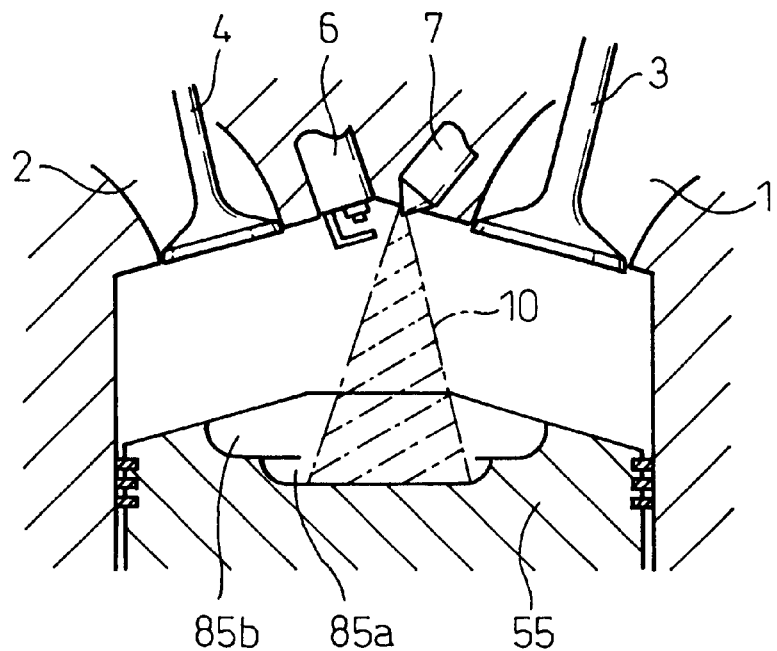
FIG. 18 is a vertical sectional view schematically illustrating a part of direct fuel injection-type spark-ignition internal combustion engine according to an eighth embodiment of the present invention.
Figure 19:
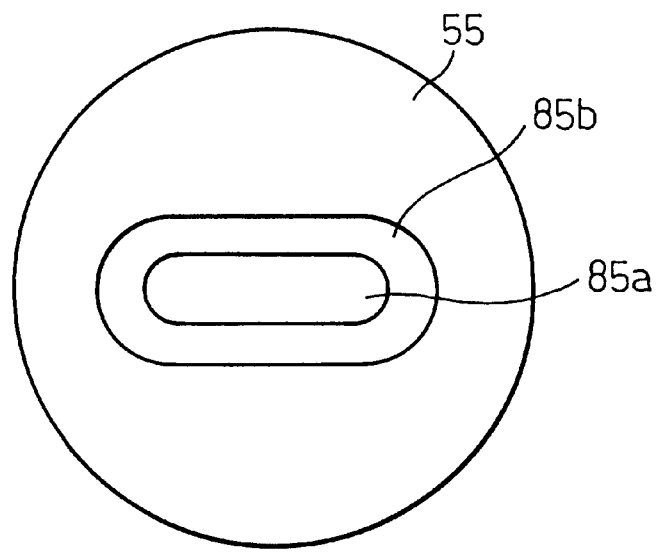
FIG. 19 is a plan view of a piston of the direct fuel injection-type spark-ignition internal combustion engine shown in FIG. 18.

FIG. 18 is a vertical sectional view schematically illustrating a part of direct fuel injection-type spark-ignition internal combustion engine according to an eighth embodiment of the present invention. FIG. 19 is a plan view of the piston in FIG. 18. The differences between the first and eighth embodiments are explained as follows. In the present embodiment, the groove-like cavity formed on the top surface of the piston 55 has an inside portion 85a which is deep and an outside portion 85b which is shallow surrounding the inside portion 85a. The total volume of the inside portion 85a and the outside portion 85b is almost the same as that of the cavity in the above-mentioned embodiments. However, the volume of only the inside portion 85a is smaller than that of the cavity in the above-mentioned embodiments. The spark plug 6 faces on the inside portion 85a and is preferably at the center in the longitudinal direction of the inside portion 85a. Further, the inside portion 85a of the cavity has a bottom wall curved in a concave shape in the width direction of the cavity, similar to the cavity in the first embodiment.

The fan shaped spray 10 injected by the fuel injector 7 impinges in the inside portion 85a of the cavity even when the piston is in any position. Thus, when an amount of injected fuel is small in the stratified charge combustion, the injected fuel becomes a mixture positioned in and above the inside portion 85a of the cavity and the injected fuel can be converged to a relatively small volume of mixture. Accordingly, the mixture becomes a combustible mixture, and thus certain ignition can be ensured.

Besides, when an amount of injected fuel becomes relatively large in the stratified charge combustion, the finishing time of the fuel injection is late. Therefore, in the later half of the period of the fuel injection, the fuel is injected to the piston that is relatively high, i.e., the fuel injected from the fuel injector 7 impinges on the inside portion 85a of the cavity immediately. Thus, the fuel impinges on the inside portion 85a of the cavity at a relatively high speed, and therefore a part of the fuel injected into the inside portion 52a is forced to flow out therefrom and a part of fuel impinging on the inside portion 52a also flows out therefrom by its own force. Accordingly, mixture formed in and above the inside portion 85a does not become too rich but is a combustible mixture. Besides, the fuel flowing out from the inside portion 85a becomes a combustible mixture having a suitable concentration in and above the outside portion 85b. The two combustible mixtures actually become a mass of the combustible mixture and thus can be ignited favorably by the spark plug 6 that faces on the inside portion 85.

Besides, when an amount of injected fuel becomes relatively large in the stratified charge combustion, a fuel injection pressure of the fuel injector 7 may be made high to shorten the fuel injection period. In this case, the fuel injected from the fuel injector 7 impinges on the inside portion 85a of the cavity at a relatively high speed. Therefore, a part of fuel impinging on the inside portion 52a flows out therefrom by its own force and thus, similar to the above-mentioned, the combustible mixture is formed in and above the inside portion 85a and the outside portion 85b. The combustible mixture can be ignited favorably by the spark plug 6 that faces on the inside portion 85.

Thus, according to the present embodiment, similarly to the above mentioned embodiments, an engine operating area in which the stratified charge combustion can be carried out can be enlarged on the high engine speed side and the high engine load side. Further, when an amount of injected fuel is small in stratified charge combustion, the fuel can be converged to the small volume inside portion 85a, and thus the formed mixture does not become too lean but the combustible mixture and can be certainly ignited.

Figure 20:
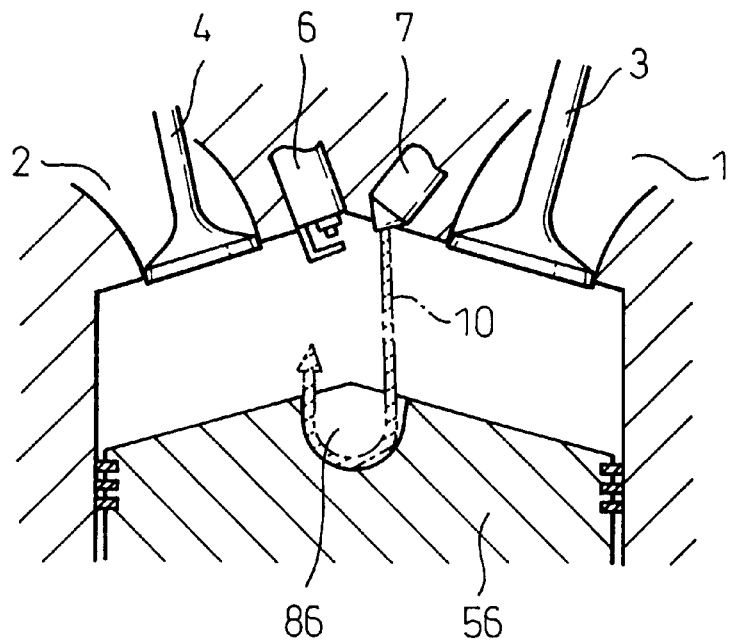
FIG. 20 is a vertical sectional view schematically illustrating a part of direct fuel injection-type spark-ignition internal combustion engine according to a ninth embodiment of the present invention.

FIG. 20 is a vertical sectional view schematically illustrating a part of direct fuel injection-type spark-ignition internal combustion engine according to a ninth embodiment of the present invention. In the present embodiment, the cavity 86, similarly to the cavity in the fifth embodiment shown in FIG. 11, is provided on the top surface of the piston 56. However, no cavity is provided on the cylinder-head. In the present embodiment, the fan shaped spray 10 injected from the fuel injector 7 impinges on the one end portion in the width direction of the curved bottom wall of the cavity 86, progresses along the bottom wall toward the other end portion, and thereafter is directed upward. The spark plug 6 is arranged in the front of the fuel directed upward. In the present embodiment, by use of the fact that the fuel in the fan shaped spray is essentially easy to vaporize, it is intended that the fuel is perfectly vaporized to receive heat from the cavity while progressing from one end portion to the other end portion of the cavity 86 and is directed to the vicinity of the spark plug 6.

Therefore, even if the fuel injection starts in the initial stage of the compression stroke, in the middle stage of the compression stroke, or in the end stage of the intake stroke in a certain case, almost all of the fuel injected from the fuel injector 7 can be vaporized and be directed to the vicinity of the spark plug 6. Therefore, a mass of the combustible mixture can be formed in the vicinity of the spark plug 6 in the end stage of the compression stroke. Thus, according to the present embodiment, an engine operating area in which the stratified charge combustion can be carried out can be enlarged on the high engine speed side and the high engine load side.

Figure 21:
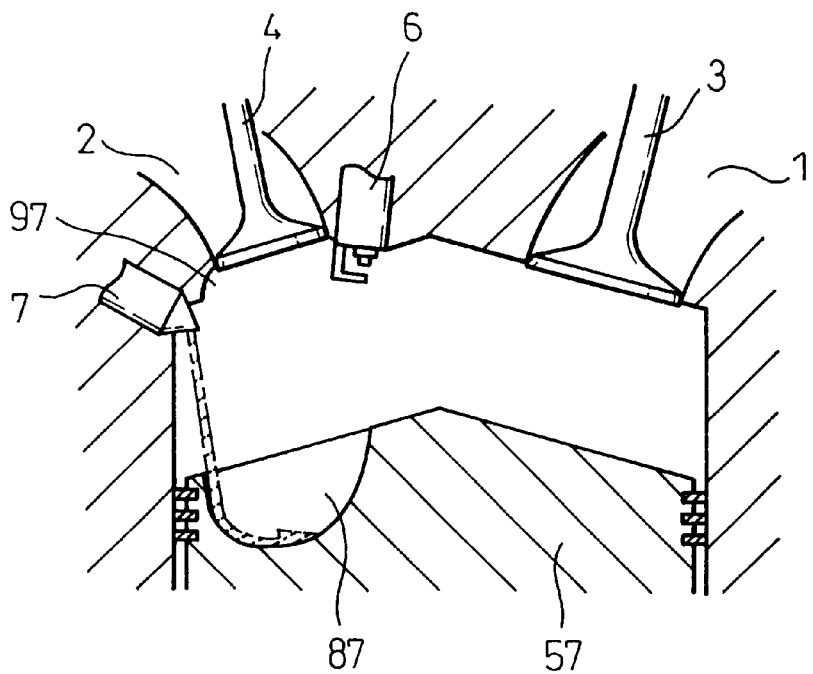
FIG. 21 is a vertical sectional view schematically illustrating a part of direct fuel injection-type spark-ignition internal combustion engine according to a tenth embodiment of the present invention.

FIG. 21 is a vertical sectional view schematically illustrating a part of direct fuel injection-type spark-ignition internal combustion engine according to a tenth embodiment of the present invention. Differences between the fifth and the tenth embodiments are explained as follows. In the present embodiment, the groove-like cavity 87 formed on the top surface of the piston 57 extends on the exhaust port side of the top surface. On the exhaust port side of the cylinder-head, the cavity 97 facing on the cavity 87 is formed. The opening of the exhaust port 2 is formed in the cavity 97.

The spark plug 6 is arranged in the cavity 97 on the cylinder-head and faces on the cavity 87 on the piston. The fuel injector 7 is arranged in the exhaust port side of the periphery of the upper portion of the cylinder and injects fuel such that the fan shaped spray is almost parallel with the center axis of the piston. The thus injected fuel progresses from the end portion in the width direction to the other end portion on the curved bottom wall of the cavity 87 and is directed upwardly. Next, the fuel impinges on the one end portion in the width direction on the bottom wall (top wall) of the cavity 97 of the cylinder-head, progresses from the one end portion to the other end portion on the curved bottom wall, and is directed downward.

Thus, similarly to the fifth embodiment, the injected fuel rotates in an oval shape by use of the cavity 87 in the piston, and the cavity 97 on the cylinder-head, and vaporizes. Therefore, at the end stage of the compression stroke, a combustible mixture rotating in the space formed by the two cavities is formed. In the present embodiment, the fuel rotating between the two cavities is in contact with the exhaust valve 4, that is at a high temperature after being exposed to the exhaust gas, and, therefore, can be easily vaporized. Thus, in comparison with the fifth embodiment, a larger amount of fuel can be vaporized in the same period or the same amount of fuel can vaporized in a shorter period, by the end stage of the compression stroke, and thus an engine operating area in which the stratified charge combustion can be carried out can enlarge on the high engine speed side and on the high engine load side.

Figure 22:
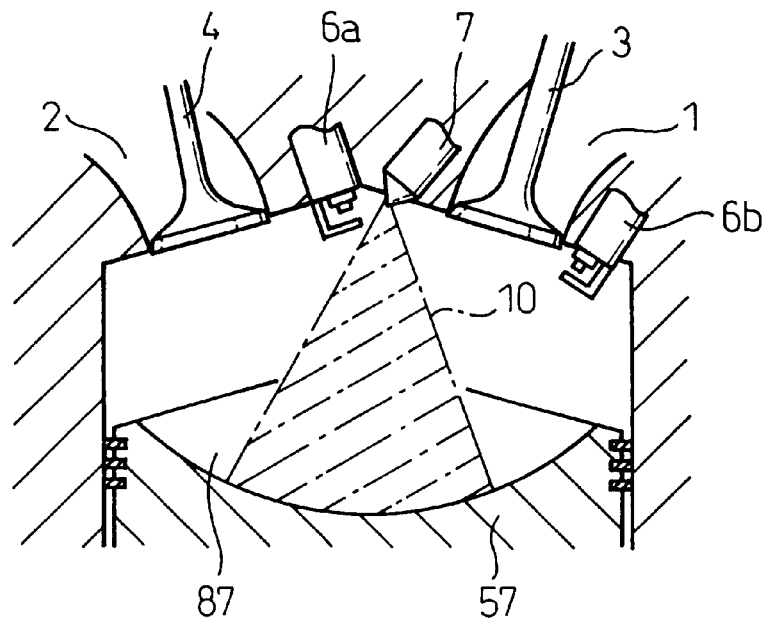
FIG. 22 is a vertical sectional view schematically illustrating a part of direct fuel injection-type spark-ignition internal combustion engine according to an eleventh embodiment of the present invention.

FIG. 22 is a vertical sectional view schematically illustrating a part of direct fuel injection-type spark-ignition internal combustion engine according to a eleventh embodiment of the present invention. Differences between the second and eleventh embodiments are explained as follows. In the present embodiment, the first spark plug 6a is arranged in the vicinity of the center of the upper portion of the cylinder and the second spark plug 6b is arranged in the intake port side of the peripheral of the upper portion of the cylinder. Similarly to the cavity in the second embodiment, the groove-like cavity 87 almost crosses the top surface of the piston to pass through the center of the top surface of the piston and has the bottom surface curved in a concave shape in the longitudinal direction. Similarly to the second embodiment, the fuel injector 7 injects fuel into the cavity 87 such that the width direction of the fan shaped spray conforms to the extending direction of the cavity 87.

In the present embodiment, a tumble stream is not positively produced. However, when the intake air is introduced into the cylinder from the upper portion of the cylinder, a tumble stream that moves down along the exhaust port side of the cylinder-bore and moves up along the intake port side thereof is necessarily produced. If the tumble stream produced in the intake stroke is weak, the tumble stream disappears before the compression stroke at which the fuel is injected in the stratified charge combustion. Therefore, similarly to the second embodiment, good stratified charge combustion can be realized by use of the first spark plug 6 arranged in the vicinity of the center of the upper portion of the cylinder.

However, in the present embodiment, an engine operating area in which the stratified charge combustion can be carried out is intended to enlarge on the high engine speed side. Therefore, the engine can be operated in high engine speed operating conditions. In this time, the piston moves down at a high speed and thus the speed of the intake air introduced from the intake port 1 become high. Accordingly, the above tumble stream becomes strong. If the strong tumble stream is produced in the cylinder, the tumble stream does not disappear and exists at the end of the compression stroke. The tumble stream makes the combustible mixture, formed in the vicinity of the first spark-plug 6a arranged in the vicinity of the center of the upper portion of the cylinder, move to the intake port side. In particular, when an amount of injected fuel is small and a mass of the formed combustible mixture is small, the combustible mixture can lose contact with the first spark plug 6a and thus the first spark plug 6a cannot ignite the combustible mixture.

Figure 23:
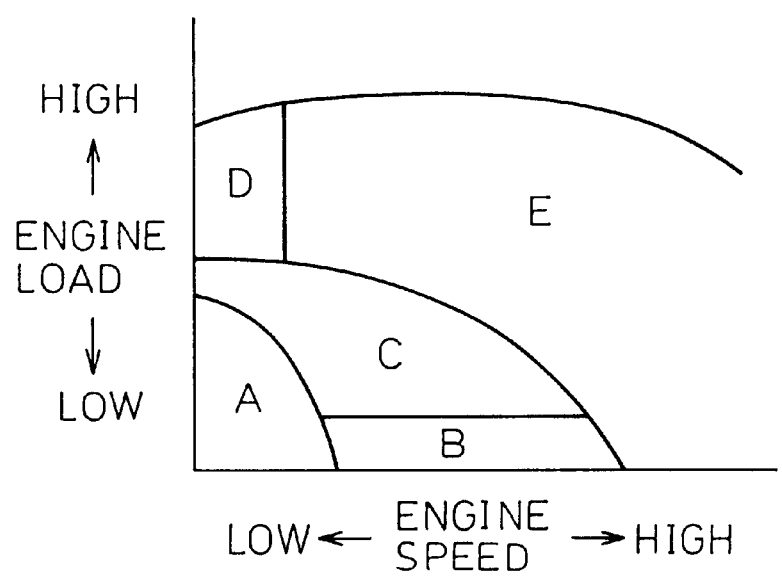
FIG. 23 is a map used in a spark plug control for the direct fuel injection-type spark-ignition internal combustion engine shown in FIG. 22.

In the present embodiment, to solve this problem, the use of the first spark plug 6a and the second spark plug 6b is controlled on the basis of a map shown in FIG. 23. In the map of FIG. 23, low engine load side areas (A), (B), and (C) are an engine operating area in which the stratified charge combustion can be carried out, and high engine load side areas (D) and (E) are an engine operating area in which uniform charge combustion can be carried out. In the uniform charge combustion, the fuel is injected in the intake stroke and the uniform charge mixture is formed in the cylinder at the ignition timing.

In a low engine speed area in the stratified charge combustion, the strong tumble stream is not produced in the cylinder in the intake stroke. Therefore, in the low engine speed and low and middle engine load area (A) in which an amount of injected fuel is relative small, similarly to the embodiments as mentioned above, the combustible mixture can be ignited by the first spark plug 6a arranged in the vicinity of the center of the upper portion of the cylinder. Immediately after igniting, the combustible mixture expands to the intake port side. Therefore, immediately after the first spark plug 6a ignites the combustible mixture, the second spark plug 6b preferably ignites the expanded combustible mixture, and thus the combustion speed can be made high and the stratified charge combustion can become more favorable.

On the other hand, in the middle and high engine speed and low engine load area (B) in which an amount of injected fuel is relative small, the tumble stream in the intake air becomes strong and thus the combustible mixture moves toward the intake port side in the end stage of the compression stroke due to the tumble stream. Accordingly, the second spark plug 6b arranged on the intake port side of the periphery of the upper portion of the cylinder ignites the combustible mixture. Immediately after igniting, the combustible mixture expands toward the center side of the cylinder. Therefore, immediately after the second spark plug 6b ignites the combustible mixture, if the first spark plug 6a ignites the expanded combustible mixture, the combustion speed becomes high and the stratified charge combustion can be made more favorable.

Besides, in the low engine speed and high engine load and middle and high engine speed and middle and high engine load area (C), an amount of injected fuel becomes relative large and thus the combustible mixture formed in the end stage of the compression stroke becomes relative large. Therefore, even if the combustible mixture is moved toward the intake port side in the end stage of the compression stroke by the tumble stream or the combustible mixture is not moved due to the disappearance of the tumble stream, the combustible mixture is in contact with both of the first spark plug 6a and the second spark plug 6b. Accordingly, the combustible mixture is ignited and burned by both of the first spark plug 6a and the second spark plug 6b. Thus, if the combustible mixture is ignited at the two points, the combustion speed is made high and the stratified charge combustion is made more favorably.

In uniform charge combustion, the intake port side of the cylinder, of which the temperature is relative low in the low engine speed area (D), easily causes knocking. Therefore, the first spark plug 6a ignites the uniform mixture and the second spark plug 6b ignites the uniform mixture before knocking is caused. The first spark plug 6a and the second spark plug 6b may ignite the uniform mixture simultaneously. Besides, the first spark plug 6a may ignite the uniform mixture and thereafter the second spark plug 6b may ignite the uniform mixture. On the other hand, in the middle and high engine speed area (E), the first spark plug 6a ignites the uniform mixture as usual. In all of the areas, if both of the first spark plug 6a and the second spark plug 6b are actuated, electric power consumption of the battery increases. However, no spark plug control is required to be able to certainly ignite the combustible mixture in spite of movement of the combustible mixture by the tumble stream.

Figure 24:
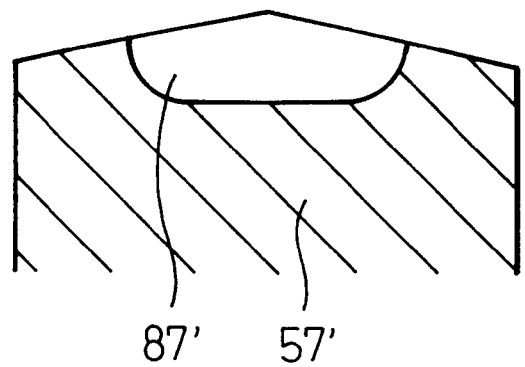
FIG. 24 is a sectional view of a piston illustrating a modification of the cavity in the direct fuel injection-type spark-ignition internal combustion engine shown in FIG. 22.
Figure 25:
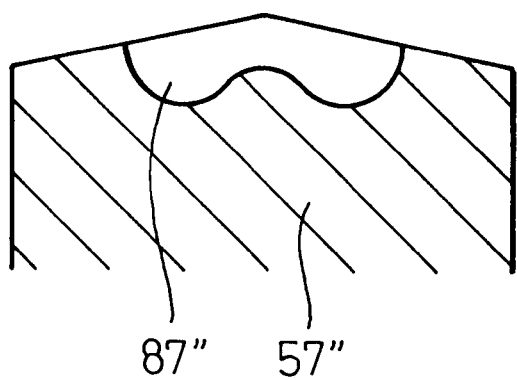
FIG. 25 is a sectional view of a piston illustrating another modification of the cavity in the direct fuel injection-type spark-ignition internal combustion engine shown in FIG. 22.

FIG. 24 shows a modification of the cavity of the present embodiment. The bottom wall of the cavity 87' formed on the piston 57' is not curved but is flat. Besides, FIG. 25 shows another modification of the cavity of the present embodiment. The center portion in the longitudinal direction of the cavity 87" formed on the piston 57" projects. The idea of the present embodiment can apply to the direct fuel injection-type spark-ignition internal combustion engine having the cavity shown in FIG. 24 or 25.

Figure 26:
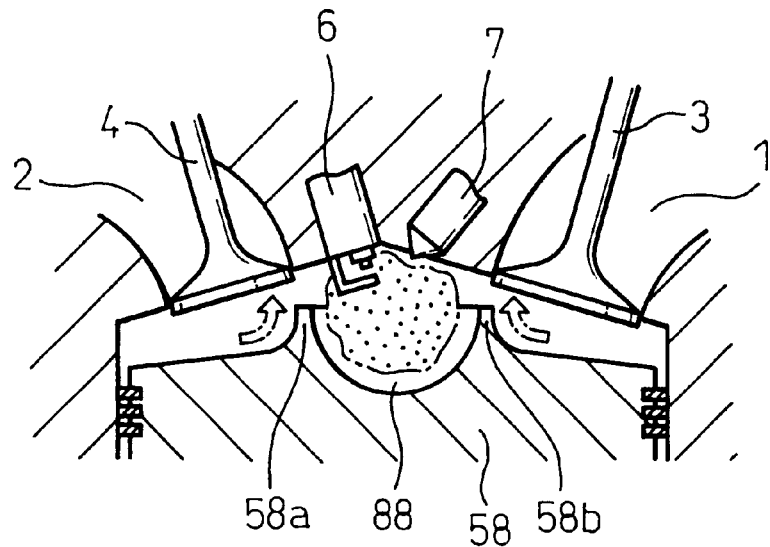
FIG. 26 is a vertical sectional view schematically illustrating a part of direct fuel injection-type spark-ignition internal combustion engine according to a twelfth embodiment of the present invention.
Figure 27:
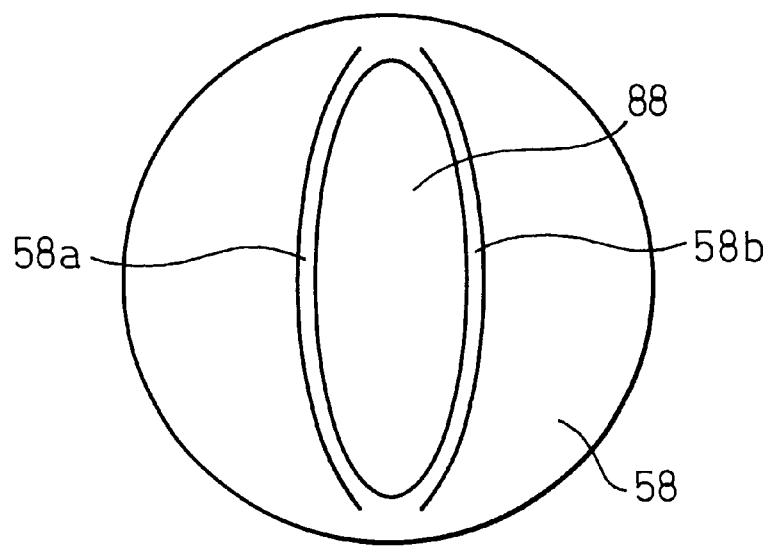
FIG. 27 is a plan view of a piston shown in FIG. 26.

FIG. 26 is a vertical sectional view schematically illustrating a part of direct fuel injection-type spark-ignition internal combustion engine according to a twelfth embodiment of the present invention, and FIG. 27 is a plan view of a piston of FIG. 26. The differences between the sixth and the twelfth embodiments are explained as follows. In the sixth embodiment, the exhaust port side of the top surface of the piston is made higher than the intake port side thereof and thus the squish area is formed between both of the exhaust port sides of the piston and the cylinder-head. It is intended that the squish stream produced by the squish area in the end stage of the compression stroke flows into the cavity and the fuel injected into the cavity is sufficiently mixed with the intake air in the cavity by the squish stream. However, the distance between both of the intake port sides of the piston and the cylinder-head cannot be made very large and thus only a weak squish can be produced between them.

If the two squish streams flow in opposite directions into the cavity, the unbalance of the strength of the two squish streams can make a part of the combustible mixture flow out from the cavity and thus the stratified charge combustion can deteriorate. In the present embodiment, rising portions 58a and 58b that extend in the longitudinal direction of the groove-like cavity 88 are formed on the top surface of the piston 58 at both of the adjacent portions in the width direction of the cavity 88. Therefore, even if two squish streams, in opposite directions each other in the intake port side and the exhaust port side, are produced, as shown by arrows in FIG. 26, these two squish streams are deflected upwardly by the rising portions 58a and 58b and thus do not flow into the cavity 88. Therefore, the combustible mixture formed in the cavity does not flow out from the cavity and thus good stratified charge combustion can be realized. In the present embodiment, the groove-like cavity 88 has an ellipse shape in a plan view as shown in FIG. 27. However, as in the above mentioned embodiments, the cavity may have a rectangular shape in a plan view.

Figure 28:
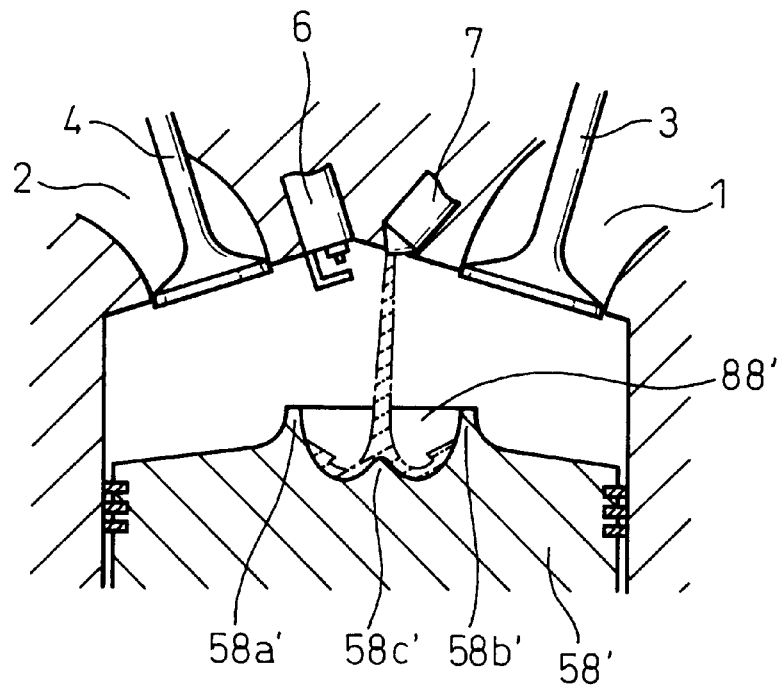
FIG. 28 is a vertical sectional view schematically illustrating a modification of the direct fuel injection-type spark-ignition internal combustion engine shown in FIG. 26.

FIG. 28 is a vertical sectional view schematically illustrating a modification of the direct fuel injection-type spark-ignition internal combustion engine of the twelfth embodiment. The differences between the modification and the twelfth embodiment are explained as follows. On the center portion in the width direction of the cavity 88' in the modification, a projection 58c' that extending in the longitudinal direction is formed. The fuel injector 7 injects fuel such that the fan shaped spray impinges on the top of the projection 58c'. Preferably, the fan shaped spray injected by the fuel injector 7 always impinges on the top of the projection 58c' in spite of the piston position.

The thus injected fuel is divided into two parts in the width direction of the cavity 88' by the projection 58c' as shown in FIG. 28. Each of the divided two parts progresses along the curved bottom wall of the cavity 88' toward the outside in the width direction, and thereafter is deflected upwardly by the side walls of the cavity 88'. The fan shaped spray is essentially easy to vaporize. However, each of the divided two parts in the thickness direction contains a smaller amount of fuel and thus is easier to vaporize by heat received from the cavity. Therefore, all of the injected fuel can be certainly vaporized by the end stage of the compression stroke and thus good stratified charge combustion can be realized.

Figure 29:
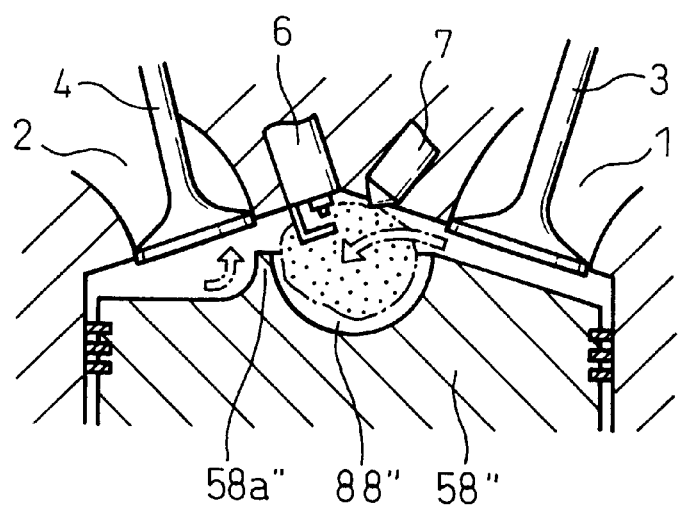
FIG. 29 is a vertical sectional view schematically illustrating another modification of the direct fuel injection-type spark-ignition internal combustion engine shown in FIG. 26.

FIG. 29 is a vertical sectional view schematically illustrating another modification of the direct fuel injection-type spark-ignition internal combustion engine of the twelfth embodiment. The differences between the modification and the twelfth embodiment are explained as follows. The rising portion 58a' that extends in the longitudinal direction of the groove-like cavity 88" formed on the top surface of the piston 58", is provided on only the exhaust port side of the adjacent portions in the width direction of the cavity 88". Further, the intake port side of the top surface of the piston is made higher than the exhaust port side thereof and thus the strong squish stream is produced in the intake port side in the end stage of the compression stroke. Therefore, the squish stream produced in the exhaust port side does not flow into the cavity by the rising portion 58" and only the strong squish stream produced in the intake port side flows into the cavity. Thus, both of the two squish streams, that flow in opposite directions each other and that cause an unbalance in strength, do not flow into the cavity and a part of the combustible mixture does not flow out from the cavity. Further, if only the squish stream in one direction flows into the cavity as the present modification, the fuel injected into the cavity can be mixed with the intake air in the cavity by use of the squish stream and thus good stratified charge combustion can be realized as explained in the sixth embodiment.

In the present modification, the rising portion 58" also functions to prevent a flowing-out of the combustible mixture from the cavity when the squish stream produced in the intake port side flows into the cavity. In the present modification, the rising portion 58" is provided on only the exhaust port side of the adjacent portions in the width direction of the cavity 88". However, the rising portion may be provided on only the intake port side of the adjacent portions in the width direction of the cavity 88".

In the above mentioned embodiments, when in high engine speed and high engine load operating conditions, the uniform charge combustion may be carried out in which the fuel is injected in the intake stroke and the uniform mixture is formed in the cylinder. Besides, in the embodiment where the fan shaped spray extends between the intake port side and the exhaust port side, the intake air introduced in the intake stroke impinges certainly the fan shaped spray and mixes sufficiently the fuel with itself. Thus, in uniform charge combustion, a sufficiently mixed uniform mixture can be formed.

Although the invention has been described with reference to specific embodiments thereof, it should be apparent that numerous modifications can be made thereto, by those skilled in the art, without departing from the basic concept and scope of the invention.

What is claimed is:

1. A direct fuel injection-spark-ignition internal combustion engine, comprising:
    a fuel injector for injecting fuel as a spray in nearly the shape of a fan having a relatively small thickness, said fuel injector is arranged nearly in a central upper portion of a cylinder;
    a spark plug;
    a cavity formed on the top surface of a piston; wherein said cavity has a long and narrow groove shape,
        said spray is injected by said fuel injector such that said spray is almost parallel with the center axis of the piston, and impinges in said cavity, and
        said spark plug is arranged in the upper portion of the cylinder to face on said cavity.

2. A direct fuel injection-spark-ignition internal combustion engine according to claim 1, wherein the bottom wall of said cavity on which said spray impinges is curved in a concave shape in the width direction of said cavity.

3. A direct fuel injection-spark-ignition internal combustion engine according to claim 1, wherein the bottom wall of said cavity on which said spray impinges is curved in a concave shape in the longitudinal direction of said cavity, and said spark plug is arranged in the upper portion of the cylinder to face the center portion in the longitudinal direction of said cavity.

4. A direct fuel injection-spark-ignition internal combustion engine according to claim 1, wherein said fuel injector injects fuel as a plurality of said sprays, said plurality of sprays being injected by said fuel injector so as to be almost parallel with the center axis of the piston and to impinge in said cavity.

5. A direct fuel injection-spark-ignition internal combustion engine according to claim 4, wherein the bottom wall of said cavity on which said plurality of spray impinges has a projection that extends in the longitudinal direction of said cavity at the center in the width direction of said cavity, and said spray impinges on said bottom wall at both sides of said projection.

6. A direct fuel injection-spark-ignition internal combustion engine according to claim 1, wherein said cavity has an inside portion of which the depth is large and an outside portion of which the depth is small, surrounding said inside portion, and said spray impinges on said inside portion of said cavity.

7. A direct fuel injection-spark-ignition-type internal combustion engine according to claim 2, wherein said spray impinges on said cavity so as to be off-set from the center in the width direction of said cavity, and said spark plug facing said cavity so as to be off-set in the opposite side of the spray impinging position from the center in the width direction of said cavity.

8. A direct fuel injection-spark-ignition-type internal combustion engine according to claim 1, wherein said cavity almost crosses the top surface of the piston from the intake port side to the exhaust port side, said spark plug faces the center portion in the longitudinal direction of said cavity, and another spark plug is arranged in the upper portion of the cylinder to face said cavity at the intake port side.

9. A direct fuel injection-spark-ignition internal combustion engine according to claim 8 wherein, when a current engine load is lower than a predetermined engine and a current engine speed is higher than a predetermined engine speed in stratified charge combustion, said another spark plug ignites the mixture.

10. A direct fuel injection-spark-ignition internal combustion engine according to claim 1, wherein a rising portion that extends in the longitudinal direction of said cavity being formed on the top surface of the piston at least one of the adjacent portions in the width direction of said cavity to prevent flowing-in of a squish stream into said cavity.

* * * * *